(12) United States Patent
Zhang et al.

(10) Patent No.: US 11,852,209 B2
(45) Date of Patent: Dec. 26, 2023

(54) FIBER-REINFORCED COPPER-BASED BRAKE PAD FOR HIGH-SPEED RAILWAY TRAIN, AND PREPARATION AND FRICTION BRAKING PERFORMANCE THEREOF

(71) Applicants: UNIVERSITY OF SCIENCE AND TECHNOLOGY BEIJING, Beijing (CN); BEIJING TIANYISHANGJIA NEW MATERIAL CORP., LTD., Beijing (CN)

(72) Inventors: Lin Zhang, Beijing (CN); Xuanhui Qu, Beijing (CN); Peng Zhang, Beijing (CN); Peifang Wu, Beijing (CN); Mingli Qin, Beijing (CN); Cairang Shijia, Beijing (CN); Jingwu Cao, Beijing (CN); Kangxi Fu, Beijing (CN)

(73) Assignees: UNIVERSITY OF SCIENCE AND TECHNOLOGY BEIJING, Beijing (CN); BEIJING TIANYISHANGJIA NEW MATERIAL CORP., LTD., Beijing (CN)

( * ) Notice: Subject to any disclaimer, the term of this patent is extended or adjusted under 35 U.S.C. 154(b) by 959 days.

(21) Appl. No.: 16/793,938

(22) Filed: Feb. 18, 2020

(65) Prior Publication Data
US 2020/0208701 A1    Jul. 2, 2020

Related U.S. Application Data

(63) Continuation of application No. PCT/CN2018/123565, filed on Dec. 25, 2018.

(30) Foreign Application Priority Data

Dec. 5, 2018    (CN) .......................... 201811480283.9

(51) Int. Cl.
| | | |
|---|---|---|
| F16D 69/02 | (2006.01) | |
| B22F 3/16 | (2006.01) | |
| B22F 7/00 | (2006.01) | |
| C22C 47/14 | (2006.01) | |
| C22C 49/02 | (2006.01) | |
| C22C 49/14 | (2006.01) | |
| F16D 65/092 | (2006.01) | |
| G01N 19/02 | (2006.01) | |
| B22F 1/10 | (2022.01) | |

(52) U.S. Cl.
CPC .............. *F16D 69/028* (2013.01); *B22F 1/10* (2022.01); *B22F 1/108* (2022.01); *B22F 3/16* (2013.01); *B22F 7/008* (2013.01); *C22C 47/14* (2013.01); *C22C 49/02* (2013.01); *C22C 49/14* (2013.01); *F16D 65/092* (2013.01); *G01N 19/02* (2013.01); *B22F 2301/10* (2013.01); *B22F 2302/40* (2013.01); *B22F 2304/10* (2013.01); *F16D 2200/0008* (2013.01); *F16D 2200/0026* (2013.01); *F16D 2200/0052* (2013.01); *F16D 2200/0065* (2013.01)

(58) Field of Classification Search
CPC ........... H04N 21/4667; H04N 21/4532; H04N 21/4668; H04N 21/4312; H04N 21/47214; H04N 21/4826; H04N 21/44222; H04N 21/25891; H04N 21/4314
See application file for complete search history.

(56) References Cited

U.S. PATENT DOCUMENTS

| 4,193,956 A | * | 3/1980 | Kalnins | ................... | B29B 13/00 |
|---|---|---|---|---|---|
| | | | | | 264/494 |
| 2001/0052373 A1 | | 12/2001 | Kanaoka | | |

FOREIGN PATENT DOCUMENTS

| CN | 102191014 A | | 9/2011 |
|---|---|---|---|
| CN | 102352899 A | * | 2/2012 |
| CN | 103194659 A | | 7/2013 |
| CN | 105567159 A | | 5/2016 |
| CN | 106424710 A | * | 2/2017 |
| CN | 107267800 A | | 10/2017 |
| CN | 107326205 A | | 11/2017 |
| CN | 107824783 A | | 3/2018 |
| CN | 108103348 A | | 6/2018 |
| EP | 3279286 A1 | | 2/2018 |

OTHER PUBLICATIONS

Search Report of PCT/CN2018/123565.
Written Opinion of PCT/CN2018/123565.

* cited by examiner

*Primary Examiner* — Anthony J Green
(74) *Attorney, Agent, or Firm* — Dragon Sun Law Firm, PC; Nathaniel Perkins

(57) ABSTRACT

The present disclosure relates to a fiber-reinforced copper-based brake pad for high-speed railway train, and preparation and friction braking performance thereof. The fiber-reinforced copper-based brake pad for high-speed railway train comprises 80-98.5 wt. % metal powder, 1-15 wt. % non-metal powder and 0.5-5 wt. % fiber component. In addition, some components are added in a specific proportion to achieve optimal performance. The copper-based powder metallurgy brake pad is obtained by powder mixing, cold-pressing and sintering with constant pressure. The friction braking performance of the obtained brake pad is tested according to a braking procedure consisting of three stages, i.e., the first stage with low-pressure and low-speed, the second stage with high-pressure high-speed and the continuous emergency braking third stage with high-pressure and high-speed. The brake pad has advantages including higher and more stable friction coefficient, higher fade and wear resistance and slighter damage to brake disc at high speeds.

19 Claims, 9 Drawing Sheets

FIBER-REINFORCED COPPER-BASED BRAKE PAD FOR HIGH-SPEED RAILWAY TRAIN, AND PREPARATION AND FRICTION BRAKING PERFORMANCE THEREOF

CROSS-REFERENCE TO RELATED APPLICATIONS

This application is a bypass continuation application of PCT Application No. PCT/CN2018/123565. This application claims priority from PCT Application No. PCT/CN2018/123565, filed Dec. 25, 2018 and CN Application No. 201811480283.9, filed Dec. 5, 2018, the contents of which are incorporated herein in the entirety by reference.

Some references, which may include patents, patent applications, and various publications, are cited and discussed in the description of the present disclosure. The citation and/or discussion of such references is provided merely to clarify the description of the present disclosure and is not an admission that any such reference is "prior art" to the disclosure described herein. All references cited and discussed in this specification are incorporated herein by reference in their entireties and to the same extent as if each reference was individually incorporated by reference.

FIELD OF THE PRESENT DISCLOSURE

The present disclosure belongs to the technical field of preparation of powder metallurgy friction materials, in particular to a fiber-reinforced copper-based brake pad for high-speed railway train, and preparation and friction braking performance thereof.

BACKGROUND OF THE PRESENT DISCLOSURE

The basic braking device of a high-speed railway train usually uses disc braking, which utilizes the friction force generated by the contact between the brake pad and the brake disc to slow down or stop the train. The brake pad and the brake disc constitute a friction pair, in which the brake pad is one of the key part for ensuring the safety of operation of the high-speed railway train, and its performance has direct influence on the braking performance of the high-speed railway train, the service life of the brake disc and the brake pad, and the safety of train operation. With the increase operation speed and braking pressure, the requirements for the performance of brake pads become higher and higher. The maximum speed of German Inter City Express (ICE) trains is 406.9 km/h. The trial run speed of V150 super-high-speed railway trains of French Train a Grande Vitesse (TGV) is 578.4 km/h. The stable running speed of Japanese high-speed railway trains is 300 km/h. The stable running speed of Chinese "Fuxing" high-speed railway trains even achieve 350 km/h.

Presently, the brake pads of high-speed railway trains are mainly copper-based powder metallurgy brake pads, owing to their outstanding friction performance, outstanding braking effect and excellent heat conductivity. However, as the train speeds up, the braking pressure become higher and higher, and the heat and thermal shock generated during the braking are also greatly increased. The copper on the friction surface is softened and flows under high extrusion pressure and high temperature, resulting in severe fluctuation of the friction coefficient and significant heat fade phenomenon in the braking process. In addition, the existing brake pads cause severe damages to the brake discs. Improving the stability of friction coefficient, reducing the heat fading of friction coefficient and protecting the brake disc are three important aspects in the development of high-performance copper-based powder metallurgy brake pads.

The performance of copper-based brake pads is greatly affected by the properties and contents of the components. At present, the main way to mitigate the softening and hamper the flow of the copper matrix at high temperatures is to add strengthening components to the copper matrix, such as iron, silicon dioxide, silicon carbide, aluminum oxide and other particles. The strengthening effect is mainly resulted from the uniform distribution of the particles in the copper matrix. In addition, the intensity of the rigid particles existing on the friction surface is greater than that of the copper matrix. In the process of friction, when the softer matrix is worn and softened, the particles protrude out of the friction surface and directly contact with the counterpart surface, and thereby the friction resistance is improved. However, at a high temperature, the softening of a copper-based brake pad materials mainly occurs in the friction surface. Once the surface is softened, under the condition of severe cyclic thermal stress and pressure, the protruding rigid particles are not enough to bear excessive load and may be easy to break or even fall off from the matrix, owing to the characteristics of granular morphology and the weak interface with the copper matrix. As a result, the pinning and protection effect of the rigid particles on the softened and flowing friction film is severely decreased. Consequently, a stable friction film can't be formed on the friction surface of the brake pad material. The softening and flow of the friction surface are the main reasons for the fading of the friction coefficient and the sharp increase of the amount of wear at a high speed. Therefore, the present disclosure controls the properties of the friction film by adjusting the types, contents and proportions of the added components, and thereby regulates the magnitude of the friction coefficient, improves the stability of the friction coefficient and reduces the amount of wear, so that the material is suitable for high-speed railway trains at higher speed levels.

Therefore, a heretofore unaddressed need exists in the art to address the aforementioned deficiencies and inadequacies.

SUMMARY OF THE PRESENT DISCLOSURE

Technical problem: in view of the problems of the existing copper-based brake pads for braking of high-speed railway trains, including great fluctuation and severe fading of the friction coefficient, low wear resistance and severe damage to the brake disc, a method for improving the friction braking performance of copper-based brake pads by virtue of the cooperation among the components is provided. The copper matrix is strengthened by adding a flexible fiber component (carbon fibers) or rigid fiber friction component (aluminum oxide fibers or silicon carbide fibers). In addition, in order to improve the composition uniformity of the brake pad and reduce the segregation of the components with high density difference, a binder is added by atomizing spray, so that the low-density graphite or fiber component uniformly adhere to the surface of the matrix powder particles, and thereby homogeneous and segregation-free copper-based mixed powder is obtained. In view of the great thickness of the friction block, a double-direction pressing method is used in the pressing process to ensure the uniformity of the density of the compact, the density and shear strength of the brake pad are improved by repressing and resintering, and finally a brake pad for high-speed railway train, which has a higher and stable friction coefficient, lower amount of wear, and less damage to the brake disc at a high speed, is obtained.

To attain the object of the present disclosure, the following technical scheme of preparation is employed: a fiber-reinforced copper-based powder metallurgy brake pad for high-speed railway train, 1. Raw materials: powdered materials: copper powder: 48-75 μm; iron powder: 45-150 μm; flake graphite powder: 180-380 μm; granular graphite powder: 106-300 μm; titanium oxide powder: <10 μm; molybdenum disulfide: 45-150 μm; chromium powder: 10-48 μm; high carbon ferrochrome: 10-48 μm;

the constituents of the fiber component are as follows: aluminum oxide fibers with diameter of 5-20 μm and length of 10-100 μm; silicon carbide fibers with diameter of 0.1-0.5 μm and length of 10-50 μm; carbon fibers with diameter of 0.2-0.6 μm and length of 5-50 μm;

the length-diameter ratio of the rigid aluminum oxide fibers is 5:1~20:1, and the length-diameter ratio of the rigid silicon carbide fibers and flexible carbon fibers is 10:1~100:1.

The weight mixture ratio of the components of the binder is: 40-70 wt. % ethylene bis-stearamide (EBS); 10-20 wt. % paraffin; 15-30 wt. % polyamide wax; 2-5 wt. % lauric acid; 20-40 wt. % stearic acid; 2-5 wt. % isooctanol acid; 5-10 wt. % polymethacrylate. The solvent is n-heptane; the binder content in the binder solution is 0.1-0.7 wt. %, and the dissolving temperature of the binder is 60-100° C.

The preparation of the copper-based brake pad comprises the following steps:

2. Material blending: the materials are weighed and blended according to the formulation of the copper-based brake pad. The formulation of the copper-based brake pad is as follows: copper powder: 45-65 wt. %; iron powder: 15-30 wt. %; flake graphite powder: 1-10 wt. %; granular graphite powder: 1-10 wt. %; titanium dioxide powder: 1-10 wt. %; molybdenum disulfide powder: 1-5 wt. %; chromium powder: 1-10 wt. %; high carbon chromium iron powder: 1-10 wt. %; aluminum oxide fibers: 1-5 wt. %; silicon carbide fibers: 0.5-3 wt. %; carbon fibers: 0.5-3 wt. %.

Preferably, the granular graphite powders and the flake graphite powders are added in proportions in weight percentage: ratio of the granular graphite powder to the flake graphite powder is 1:1~1:1.5.

Preferably, the chromium powder and the high carbon chromium iron powder are added in proportions in weight percentage: the ratio of the chromium powder to the high carbon ferrochrome powder is 1:1~1:1.5.

Preferably, the aluminum oxide fibers, the silicon carbide fibers, and the carbon fibers are coated with copper or nickel by chemical plating, and the thickness of the copper or nickel coating is 1-3 μm.

Preferably, the aluminum oxide fibers, the silicon carbide fibers, and the carbon fibers are coated by chemical plating.

3. Powder mixing: loading raw material powder at different ratio into a double-cone atomizing mixer, turning on a heat transfer oil pump, and heating up a mixing cylinder to 80-140° C.; binding the mixed powder in a double-cone atomizing mixer; first, dissolving a binding lubricant in a solvent at the temperature of 60-100° C. to form a binder solution; heating up the binder solution to 80-120° C., carrying the binder solution with a gas at 0.1 MPa-1 MPa pressure for loading the binder solution into the double-cone atomizing mixer; atomizing the binder solution and uniformly spraying it on the continuously rolling material, and mixing the material and the binder solution for 6-10 h to obtain binder-treated powder.

4. Powder pressing: the homogeneously mixed copper-based powder is cold pressed with double-direction pressing at 400-500 MPa pressing pressure;

5. Brake pad sintering: sintering the cold-pressed compact in a hot-pressed sintering furnace at the sintering temperature of 850° C.–950° C. and hot pressing pressure of 2 MPa-4 MPa for 60-120 min, in a mixed sintering atmosphere composed of hydrogen and nitrogen; cooling down the compact to a temperature lower than 100° C. at a constant pressure, and then taking out the compact.

6. Friction braking performance testing: the friction braking performance testing comprises three stages:

first stage: the stage with low-pressure and low-speed: setting the brake pressure to be lower than 0.35 MPa and getting a testing braking speed at intervals of 20-50 km/h from 0-200 km/h, repeating the test for at least 3 times at each testing braking speed, and setting the initial temperature to be lower than 60° C.;

second stage: the stage with high-pressure and high-speed: increasing the braking pressure to 0.35-0.6 MPa and setting the braking speed to 200-400 km/h, repeating the test for at least 3 times at each testing braking speed, and setting the initial temperature to be not higher than 60° C.;

third stage: applying emergency braking for 10 times consecutively at maximum braking pressure and maximum braking speed with a braking interval not longer than 1 min, logging the average friction coefficient in each braking time and the total amount of wear after the entire test is completed.

The present disclosure employs pure electrolytic copper powder as the matrix, and doesn't adding any solid solution strengthening element, so as to ensure the high thermal conductivity of the copper-based brake pad material. Granular graphite has high thermal conductivity and high strength. When granular graphite is used together with flake graphite at a certain ratio, the strength of the matrix can be improved while the partitioning effect of the flake graphite on the matrix can be reduced, and thereby amount of wear can be reduced and the friction coefficient can be improved. Chromium and high carbon ferrochrome that have high strength and high wear resistance can replace the ceramic particles in the brake pads. Chromium has high affinity with oxygen and is easy to be oxidized to form chromium oxide particles in the sintering process. In addition, there is obvious mutual diffusion between chromium and iron, which improves the interface bonding between the chromium and the matrix, and Kirkendall pores are formed inside the chromium particles. In the braking process, the porous chromium particles are broken gradually, and thus provide fine chromium oxide particles for the formation of a friction film as well as improve the strength of the friction film. As a hard phase, the ferrochrome particles support and protect the friction film. Therefore, when added at a certain ratio, they can take a synergistic effect, improve the integrity of the surface friction film, and thereby improve the friction braking performance of the copper-based brake pad material. By adding anatase titanium oxide particles with small particle size, the strength of the brake pad material can be enhanced, and the friction film can be dispersion-strengthened on the friction surface. In addition, compared with rutile titanium dioxide, silicon carbide or aluminum oxide particles, anatase titanium dioxide particles have lower hardness. Therefore, the damage of the hard phase to the brake disc can be reduced effectively. The existence of single or multiple fiber components in the matrix can strengthen the matrix. Owing to the great length-diameter ratio, the fibers on the friction surface are partially embedded in the matrix and partially participates the formation of the friction film. Owing to the high elastic modulus, the fibers are not easy to break under high pressure, can bear the load, and take an anchoring or pinning effect for the friction film. Such an effect can hamper the flow of the friction film caused by softening at a high speed, protect the friction film from being damaged under high shear stress, and thereby promote the formation of a continuous and stable friction film. The stability of the friction film plays an important role in reducing the fading of the friction coefficient and the amount of wear. In addition, the fiber component plays the role of an elastic component in the copper-based brake pad, so that the brake pad has certain elasticity under great braking pressure or in a repeated braking process. The fiber component has a certain buffering effect against high stress, and is helpful for reducing the fading of the friction coefficient of the brake pad. In order to solve the problem of uneven distribution of matrix components resulted from the high difference in density between different components in the copper-based brake pad, a binder is sprayed in the double-cone atomizing mixer to bind the raw powder. Thus, the segregation of the low-density components is effectively reduced, and the uniformity of the brake pad product is improved. In addition, the present disclosure formulates a simple and efficient method for testing the friction braking performance of a copper-based brake pad material, which can accurately reflect the friction braking performance of a brake pad under the braking conditions of low-pressure and low-speed, high-pressure and high-speed, and continuous emergency braking at high-pressure and high-speed.

One or more examples of the present disclosure will be detailed in the following embodiments with reference to the accompanying drawings. Other features, objects and advantages of the present disclosure can be understood through reading the embodiments, accompanying drawings, and the claims.

BRIEF DESCRIPTION OF DRAWINGS

The accompanying drawings illustrate one or more embodiments of the present disclosure and, together with the written description, serve to explain the principles of the present disclosure. Wherever possible, the same reference numbers are used throughout the drawings to refer to the same or like elements of an embodiment.

In FIG. 7 (a), it can be seen that there are many furrows and fatigue cracks perpendicular to the friction direction in the surface of the brake pad material containing 7 wt. % Cr; in FIG. 7(b), the damage of the friction film incurred by cracked chromium can be seen. FIG. 7 (e) shows that there are many peeling pits in the surface of the brake pad, and FIG. 7 (f) shows the broken ferrochrome particles. FIGS. 7(c) and 7(d) show friction films that are integral. During the sintering of the brake pad material, the chromium reacts with the iron in the matrix and the oxygen in the atmosphere to form porous particles with low strength. In the friction process, the porous chromium acts as the source of fine oxides in the friction film and takes an effect of dispersion strengthening on the friction film. The ferrochrome acts as a hard phase and supports the oxide film in the friction process. A good synergetic effect can be attained by adding them at a certain ratio, so as to maintain the friction film in a good condition. Therefore, a brake material containing 4 wt. % CrFe and 3 wt. % Cr has excellent friction wear properties.

DETAILED DESCRIPTION OF THE EMBODIMENTS

Figure 1:
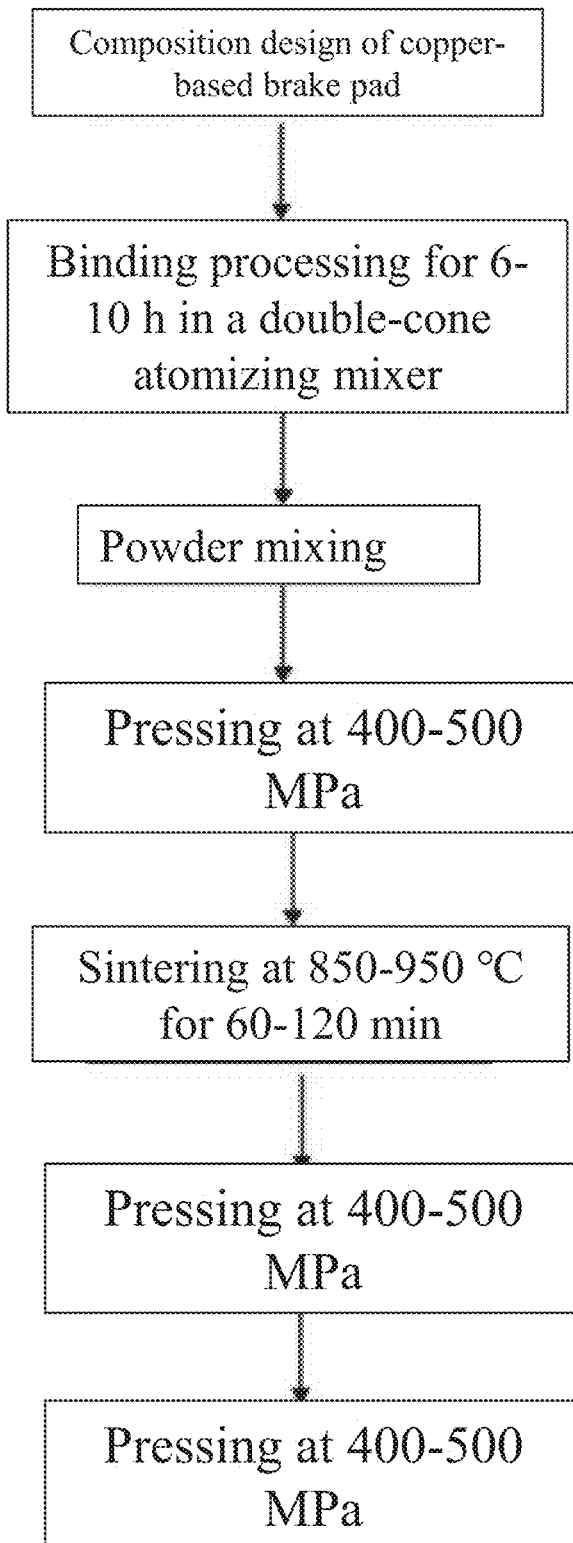
FIG. 1 is a flow chart of preparation of the brake pad in the present disclosure. The components of the copper-based brake pad are optimized and designed, then the raw material powder is processed by binding, pressing, and sintering, and finally the friction braking performance of the brake pad is tested.
Figure 2:
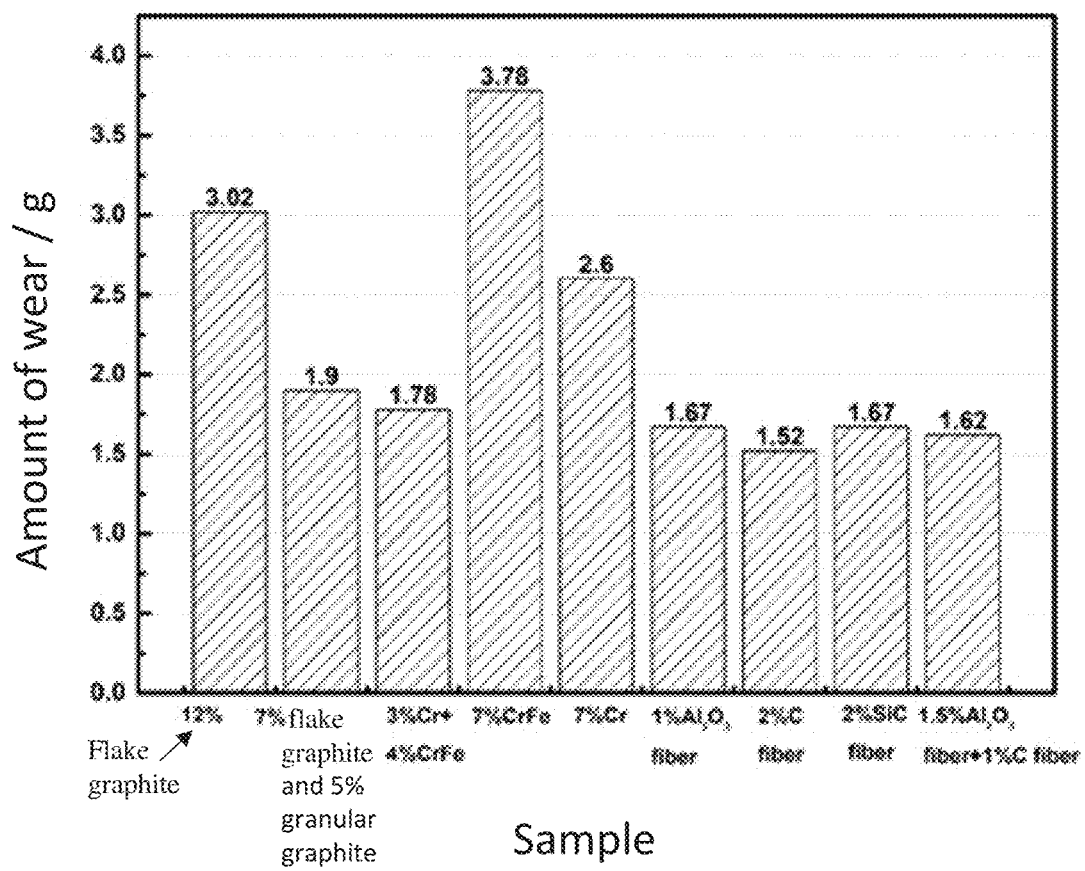
FIG. 2 shows the total amount of wear after the samples in the embodiments 1-9 are tested. The embodiments 2 and 3 show a small amount of wear, which indicates that the wear resistance of the copper-based brake pad can be improved by adding granular graphite and flake graphite, chromium powder and high-carbon chromium powder in certain proportions; the embodiments 6-9 show a small amount of wear, which indicates that the wear resistance of the copper-based brake pad can also be improved by adding a fiber component in the samples. Wherein, when carbon fibers are added, the material has the smallest amount of wear.
Figure 3:
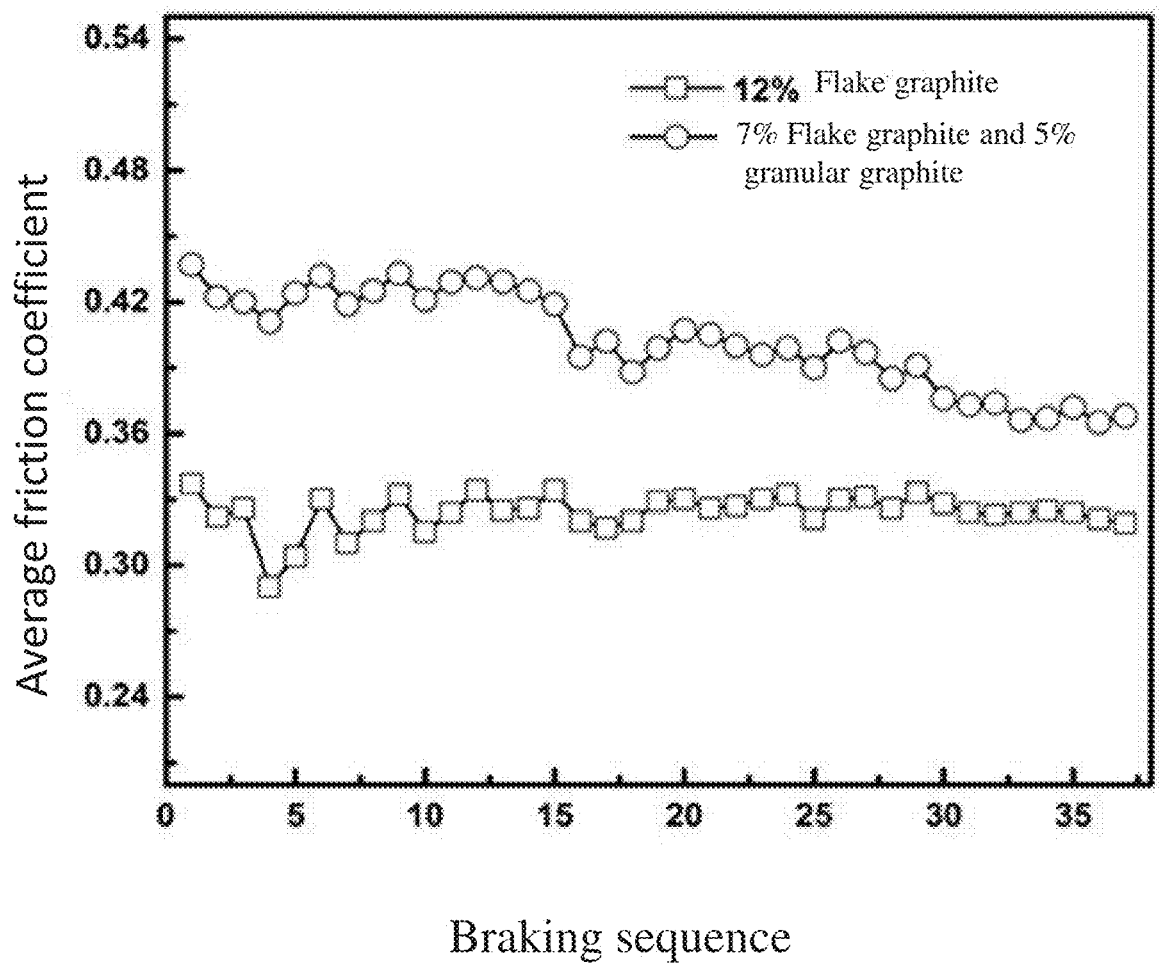
FIG. 3 shows the change of the friction coefficient of the brake pad material in examples 1-2 with the number of braking times. The friction coefficient of a brake pad material that only contains flake graphite is stable in the entire braking process, but the friction coefficient is low. After granular graphite is added, the friction coefficient is obviously increased, though the friction coefficient fades slightly in the late stage of braking.
Figure 4:
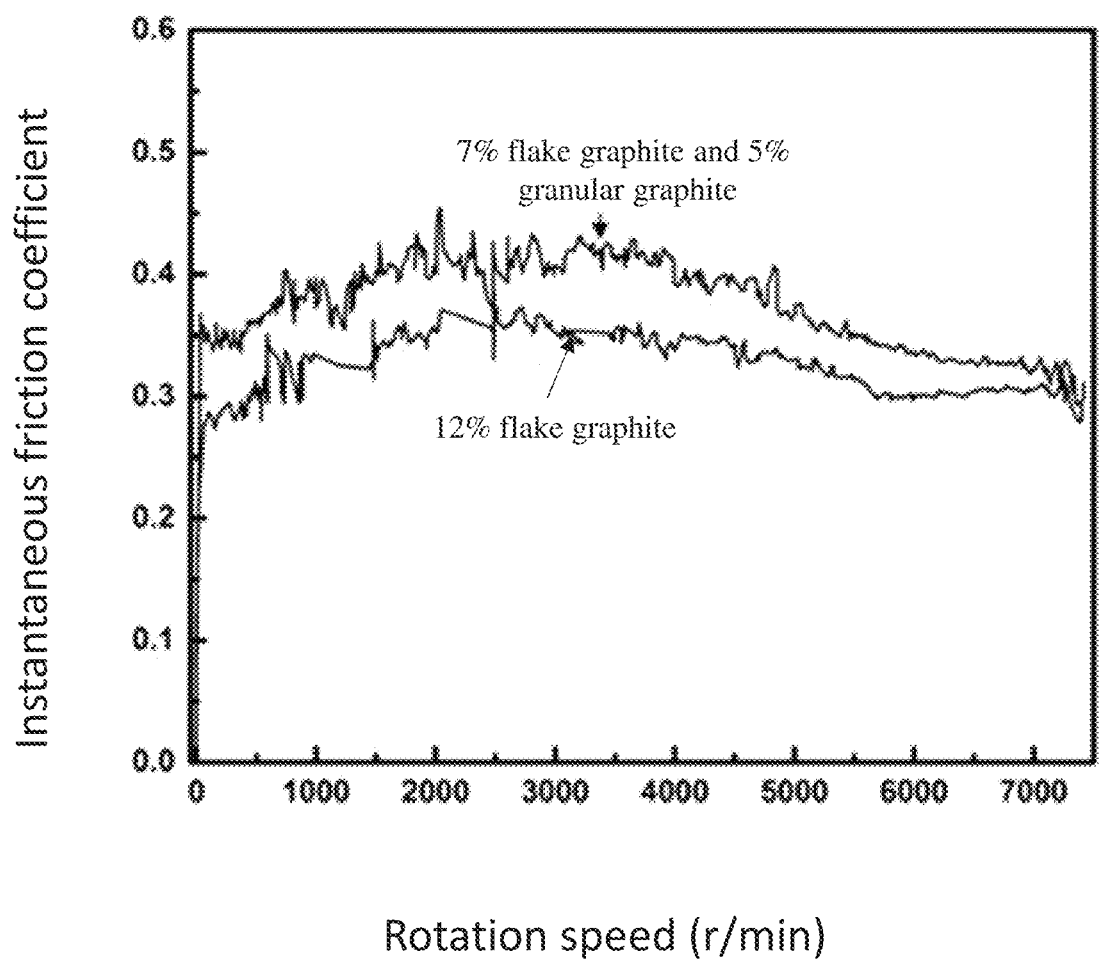
FIG. 4 shows the change of the instantaneous friction coefficient of the brake pad material in examples 1-2 with the rotation speed during braking. The change trends of the instantaneous friction coefficient of the two samples are essentially the same; however, the instantaneous friction coefficient starts to increase when the rotation speed is lower than 6,000 r/min, and the increase of the friction coefficient of the brake pad sample in which granular graphite is added is higher than the increase of the friction coefficient of the brake pad samples that only contains flake graphite.
Figure 5:
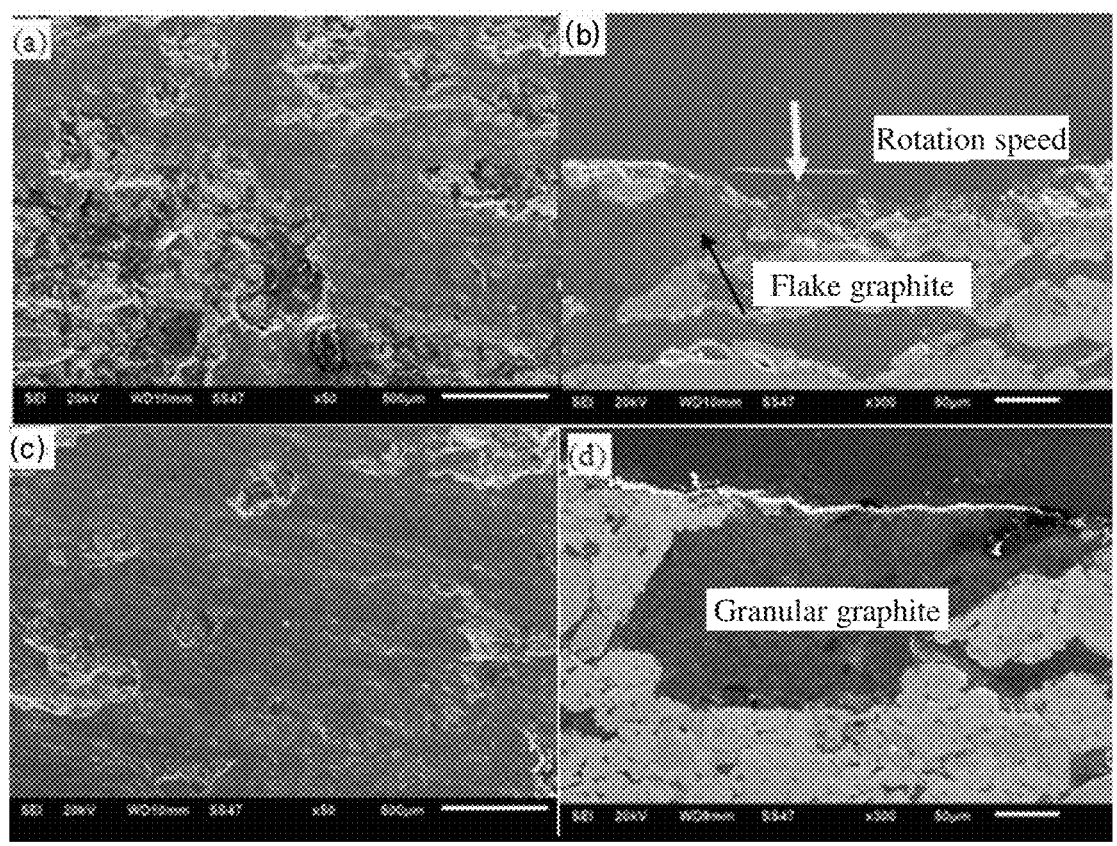
FIG. 5 shows the microstructure of the friction surface and the cross section of the friction film after a series of braking tests: (a, b) 12 wt. % flake graphite; (c, d) 7 wt. % flake graphite+5 wt. % granular graphite. It can be seen from the figure that the friction film formed on the surface of the brake pad material that contains granular graphite is continuous and integral, and the surface quality is good. However, viewed from the cross section, it can be seen that the falling-off pits formed at the graphite positions in the longitudinal section gradually change from falling-off of large-area flake graphite to contact of small-area granular graphite. Owing to a fact that the strength of artificial graphite is significantly higher than that of flake graphite, in the friction process, the granular graphite on the friction surface plays a role of a hard phase, participates in the friction, bears the load and pins third bodies, hinders the rotation of the brake disc, and thereby improves the friction coefficient. Furthermore, in the friction process, it can reduce the generation of peeling wear, increase the friction coefficient and reduce the amount of wear. Since granular graphite and flake graphite are used in combination, the cracks propagating along the flake graphite will be stopped or deflected when they encounter the granular graphite. Thus, the amount of wear can be reduced and the quality of the friction surface can be improved.
Figure 6:
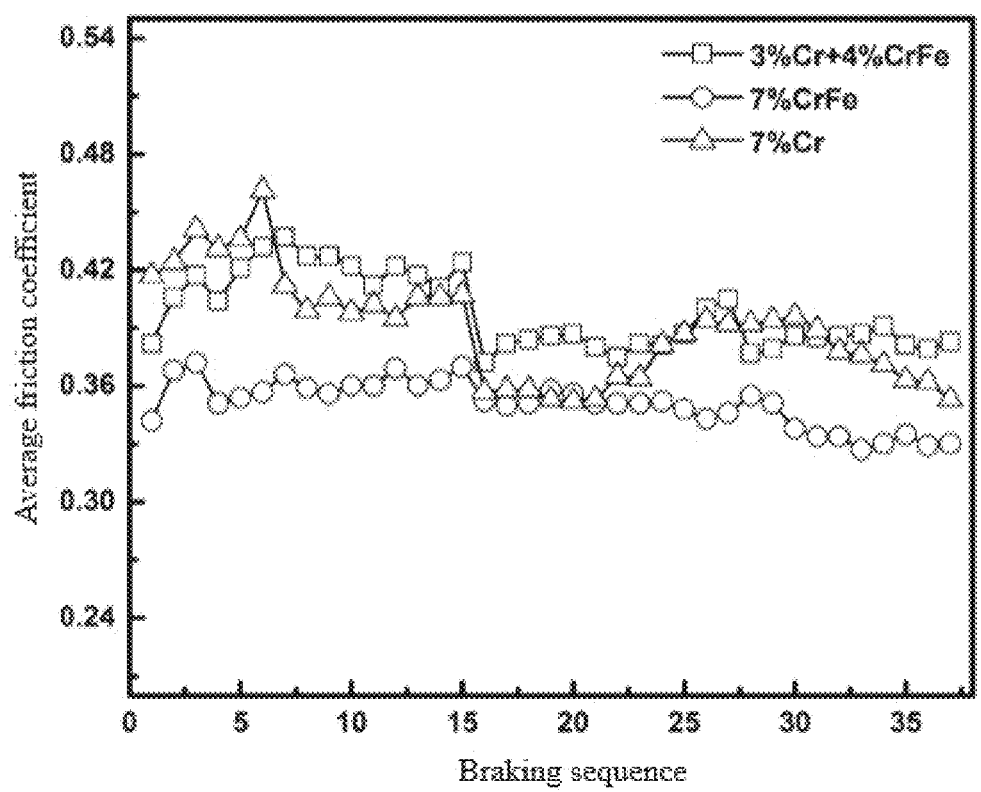
FIG. 6 shows the change of the friction coefficient of the brake pad material in examples 3-5 with the number of braking times. The friction coefficient of a brake pad material with 7 wt. % CrFe is low and stable from low speed to high speed, but the amount of wear is large. A brake pad material with 7 wt. % Cr has a high friction coefficient at low speed; the friction coefficient is lower at high speed, and the friction coefficient fades in the last stage of the braking test, but the amount of wear is still large. A brake pad material with 4 wt. % CrFe and 3 wt. % Cr maintains a relatively stable and high friction coefficient in the entire braking process, and has a small amount of wear, which indicates that the synergetic effect of chromium and ferrochromium can remarkably improve the braking performance of the material.
Figure 7:
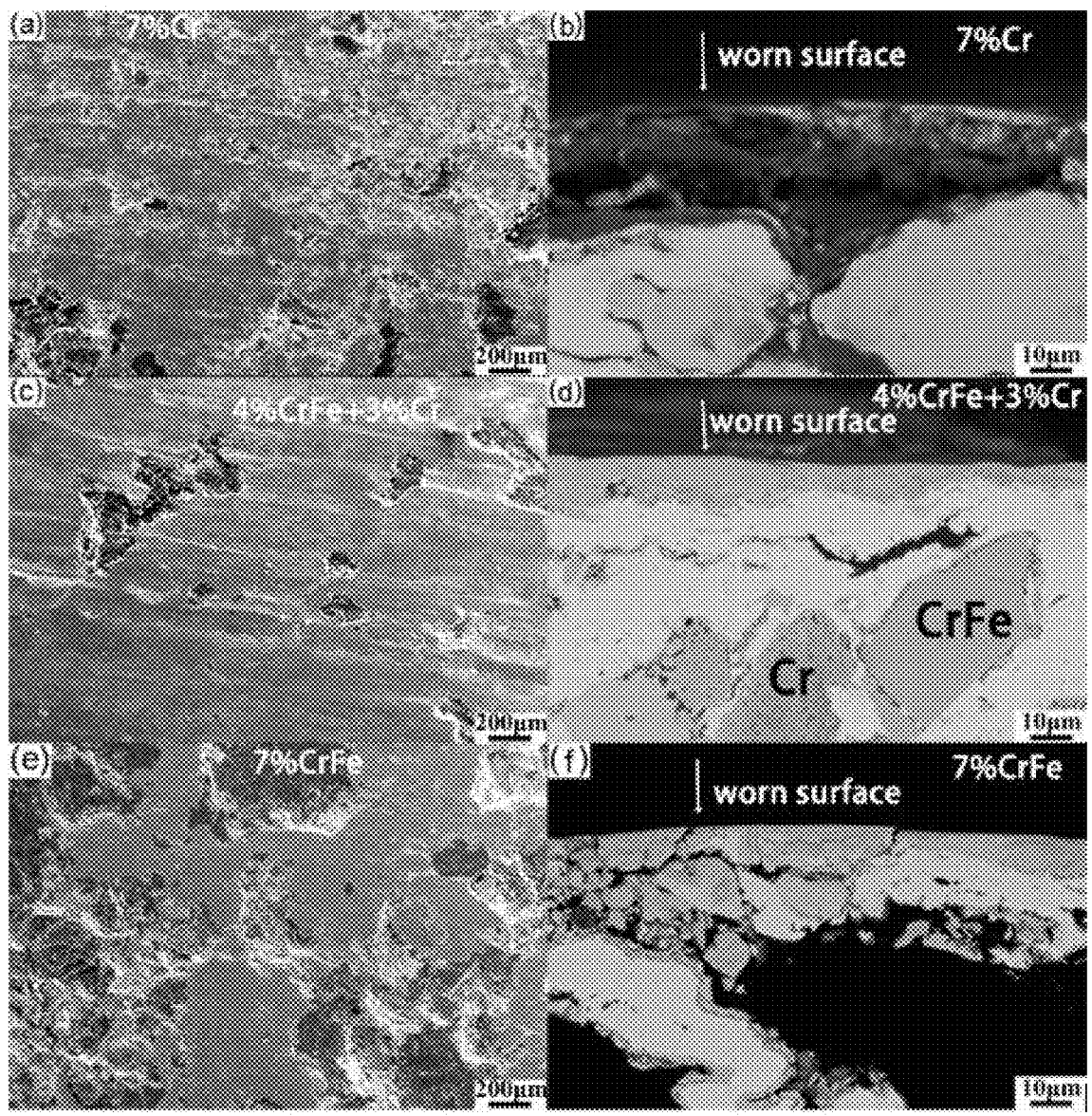
FIG. 7 shows the morphologies of the friction surfaces of the brake pad materials in embodiments 3-5 after braking test.
Figure 8:
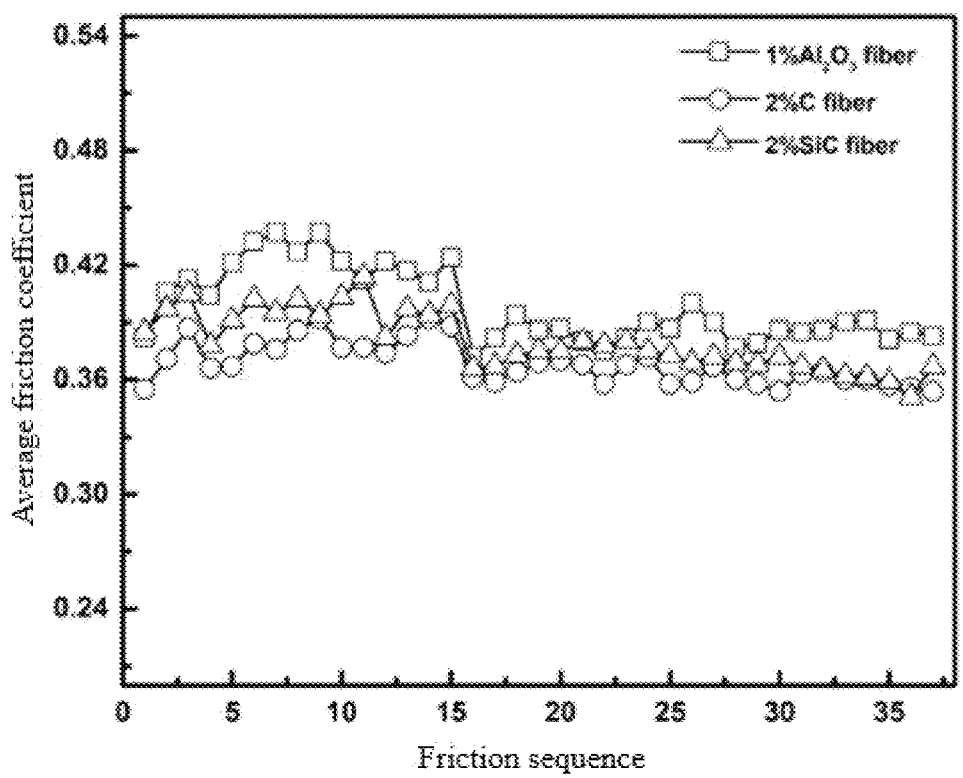
FIG. 8 shows the change of the average friction coefficients of the brake pad materials containing different kinds of fibers in embodiments 6-8 with the number of braking times. The friction coefficients of the three materials are high and stable, and essentially are 0.36-0.42, and have no obvious fading at high speed. Among them, the friction coefficient of the material with aluminum oxide fibers is the highest, and the friction coefficient of the material with carbon fibers is the lowest.
Figure 9:
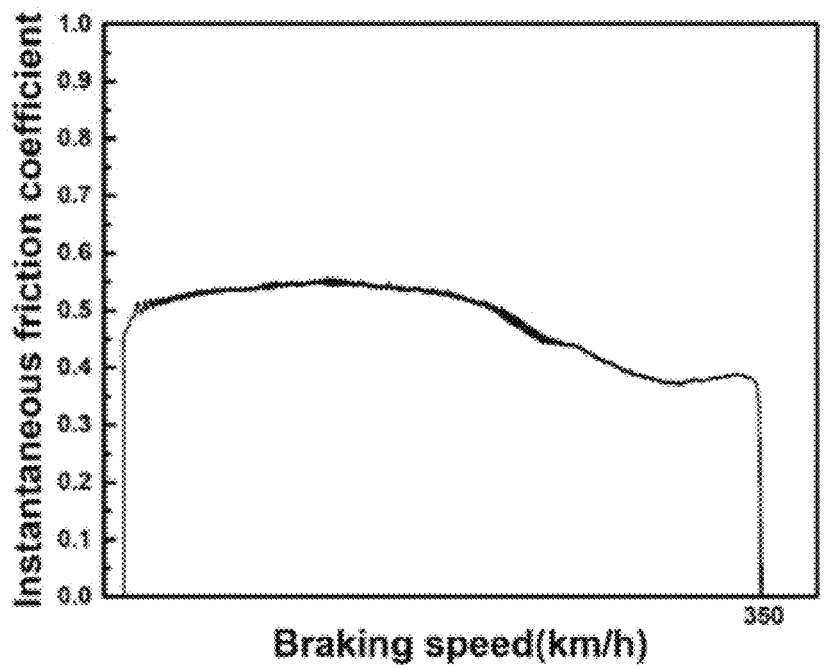
FIG. 9 shows the instantaneous friction coefficient of the brake pad that contains aluminum oxide fibers in embodiment 7 in braking at 350 km/h. From high speed to low speed, the instantaneous friction coefficient increases slowly first as the rotation speed is decreased, and then remains relatively stable, which indicates that the brake pad that contains aluminum oxide fibers has a stable friction coefficient in emergency braking at high speed.
Figure 10:
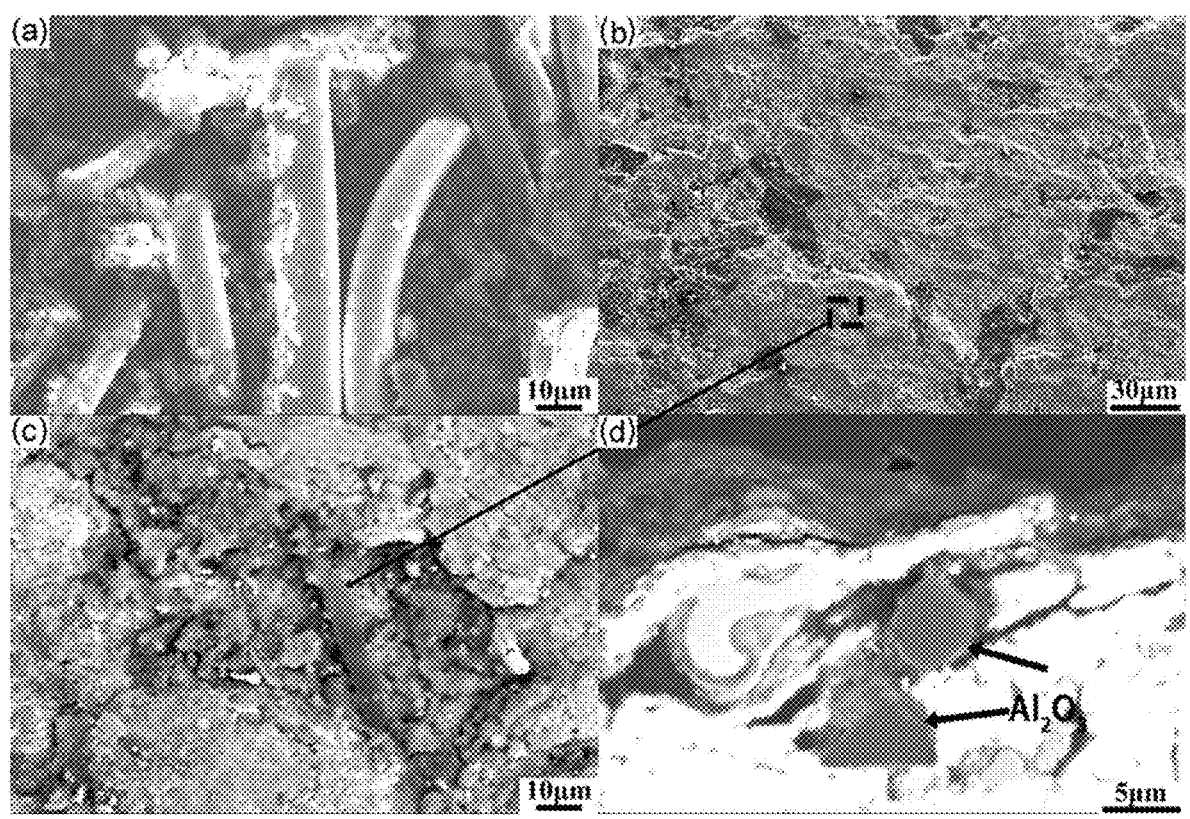
FIG. 10 shows the morphology of the friction film of the brake pad that contained aluminum oxide fibers in embodiment 7 after the braking test. The mechanical properties of the material can be strengthened by adding a proper amount of fibers in the brake pad material. In addition, the aluminum oxide fibers existing on the surface hampers the flow of the surface material in the friction process, and a friction film can be formed stably on the friction surface, and thereby the friction coefficient is stabilized and the amount of wear is reduced.

The present disclosure will now be described more fully hereinafter with reference to the accompanying drawings, in which exemplary embodiments of the present disclosure are shown. The present disclosure may, however, be embodied in many different forms and should not be construed as limited to the embodiments set forth herein. Rather, these embodiments are provided so that this disclosure is thorough and complete, and will fully convey the scope of the present disclosure to those skilled in the art. Like reference numerals refer to like elements throughout.

Embodiments of the present disclosure are illustrated in detail hereinafter with reference to accompanying drawings. It should be understood that specific embodiments described herein are merely intended to explain the present disclosure, but not intended to limit the present disclosure.

Hereunder the technical scheme of the present disclosure will be further detailed in some embodiments, with reference to the accompanying drawings.

A fiber-reinforced copper-based powder metallurgy brake pad for high-speed railway train, the composition of which comprises metal powder, non-metal powder, and a fiber component;
  wherein the weight percentage of the metal powder is 80-98.5%,
  the weight percentage of the non-metal powder is 1-20%, and the weight percentage of the fiber component is 0.5-5%.

The weight percentages of the components of the metal powder are as follows: copper powder: 45-65%; iron powder: 15-30%; anatase titanium dioxide powder: 1-10%; molybdenum disulfide powder: 1-5%; chromium powder: 1-10%; high carbon ferrochrome powder: 1-10%; the particle size of the copper powder is 48-75 μm, the particle size of the iron powder is 45-150 μm, the particle size of the titanium oxide powder is <10 μm, the particle size of the molybdenum disulfide is 45-150 μm, the particle size of the chromium powder is 10-48 μm, and the particle size of the high carbon ferrochrome powder is 10-48 μm.

The weight percentages of the components of the non-metallic powder are: flake graphite powder: 1-10%; granular graphite powder: 1-10%. The particle size of the flake graphite powder is 180-380 μm, and the particle size of the granular graphite powder is 106-300 μm.

The fiber component is one of aluminum oxide fibers, silicon carbide fibers and carbon fibers: wherein, the weight percentage of the fiber component is 1-5% if aluminum oxide fibers are selected, and the weight percentage of the fiber component is 0.5-3% if silicon carbide fibers or carbon fibers are selected. In a case that rigid fibers and flexible fibers are used in combination, the ratio of the rigid aluminum oxide fibers or silicon carbide fibers to the flexible carbon fibers is 1:0.5-1:1.

The aluminum oxide fibers with diameter of 5-20 μm and length of 10-100 μm; silicon carbide fibers with diameter of 0.1-0.5 μm and length of 10-50 μm; carbon fibers with diameter of 0.2-0.6 μm and length of 5-50 μm.

The length-diameter ratio of the rigid aluminum oxide fibers is 5:1~20:1, and the length-diameter ratio of the rigid silicon carbide fibers or flexible carbon fibers is 10:1~100:1.

The ratio of the granular graphite powder to the flake graphite powder is 1:1~1:1.5.

The ratio of the chromium powder to the high carbon ferrochrome powder is 1:1~1:1.5.

Another object of the present disclosure is to provide a method for preparing the above-mentioned fiber-reinforced copper-based powder metallurgy brake pad for high speed railway, which comprises the following steps:
  step I. mixing of powder: loading raw material powder at a preset component mixture ratio into a double-cone atomizing mixer, turning on a heat transfer oil pump, and heating up a mixing cylinder to 80-140° C.; dissolving a binder in a solvent at the temperature of 60-100° C. to form a binder solution, heating up the binder solution to 80-120° C., carrying the binder solution with a gas at 0.1 MPa-1 MPa pressure for loading the binder solution into the double-cone atomizing mixer, adding the binder solution into the continuously rolling material by atomizing and spraying, and mixing the material and the binder solution for 6-10 h to obtain binder-treated powder;
  step II. pressing of powder: molding the homogeneously mixed powder by cold-press molding at 400-500 MPa pressure to obtain a cold-pressed compact;
  step III. sintering of brake pad: sintering the cold-pressed compact in a hot-pressed sintering furnace at the sintering temperature of 850° C.–950° C. and hot pressing pressure of 2 MPa-4 MPa for 60-120 min, in a mixed sintering atmosphere composed of hydrogen and nitrogen; cooling down the compact to a temperature lower than 100° C. at a constant pressure, and then taking out the brake pad; thus, a sintered brake pad is obtained;

the weight percentage of components of the binder is: ethylene bis-stearamide, 40-70%; paraffin, 10-20%; polyamide wax, 15-30%; lauric acid, 2-5%; stearic acid, 20-40%; isooctanoid acid, 2-5%; polymethacrylate, 5-10%.

The solvent is n-heptane; the binder content in the binder solution is 0.1-0.7 wt. %, and the dissolving temperature of the binder is 60-100° C.

Another object of the present disclosure is to provide a method for testing the friction braking performance of the above-mentioned fiber-reinforced copper-based powder metallurgy brake pad for high speed railway, which comprises the following steps:

first stage: the stage with low-pressure and low-speed: setting the brake pressure to be lower than 0.35 MPa and getting a testing braking speed at intervals of 20-50 km/h from 0-200 km/h, repeating the test for at least 3 times at each testing braking speed, and setting the initial temperature to be lower than 60° C.;

second stage: the stage with high-pressure and high-speed: increasing the braking pressure to 0.35-0.6 MPa and setting the braking speed to 200-400 km/h, repeating the test for at least 3 times at each testing braking speed, and setting the initial temperature to be not higher than 60° C.;

third stage: applying emergency braking for 10 times consecutively at maximum braking pressure and maximum braking speed with a braking interval not longer than 1 min, logging the average friction coefficient in each braking time and the total amount of wear after the entire test is completed.

Embodiment 1

In the copper-based powder metallurgy brake pad for high-speed railway train in the present disclosure, focus is set to a synergetic effect of granular graphite and flake graphite. Therefore, the synergetic effect is emphasized in this embodiment. For the purpose of comparison, a brake pad material that contains flake graphite powder only (12 wt. % flake graphite powder (300 μm)) is prepared with the same method. 59 wt. % copper powder (62 μm), 18 wt. % iron powder (106 μm), 12 wt. % flake graphite powder (300 μm), 1 wt. % titanium oxide powder (6.5 μm), 2 wt. % molybdenum disulfide powder (106 μm), 4 wt. % chromium powder (45 μm), and 4 wt. % high carbon ferrochrome powder (45 μm) are poured into a double-cone atomizing mixer, the materials are rolled as the mixing cylinder rotates continuously, a binding lubricant solution is sprayed in an atomized form with high pressure gas at about 0.5 MPa pressure and contacts with the rolling material sufficiently; after 8 h material mixing, the homogeneously mixed powder is molded by cold-press molding at 500 MPa pressure. A cold compact is sintered in a hot-pressed sintering furnace by heating up to 900° C., sintering in mixed hydrogen and nitrogen gas, and holding at the temperature for 90 min, at 2.5 MPa constant hot pressing pressure; the brake pad is cooled down to 100° C. at a constant pressure and then taken out.

Embodiment 2

The friction braking performance of two kinds of brake pad materials are tested. 59 wt. % copper powder (62 μm), 18 wt. % iron powder (106 μm), 7 wt. % flake graphite powder (300 μm), 5 wt. % granular graphite powder (180 μm), 1 wt. % titanium oxide powder (6.5 μm), 2 wt. % molybdenum disulfide powder (106 μm), 4 wt. % chromium powder (45 μm), and 4 wt. % high carbon ferrochrome powder (45 μm) are poured into a double-cone atomizing mixer, the materials are rolled as the mixing cylinder rotates continuously, a binding lubricant solution is sprayed in an atomized form with high pressure gas at about 0.5 MPa pressure and contacts with the rolling material sufficiently; after 8 h material mixing, the homogeneously mixed powder is molded by cold-press molding at 500 MPa pressure. A cold compact is sintered in a hot-pressed sintering furnace by heating up to 900° C., sintering in mixed hydrogen and nitrogen gas, and holding at the temperature for 90 min, at 2.5 MPa constant hot pressing pressure; the compact is cooled down to 100° C. at a constant pressure and then taken out.

Through comparing the embodiments 1 and 2, it is seen that the friction coefficient of the brake pad material that contains flake graphite is stable in the entire braking process, but the friction coefficient is low, and the amount of wear is large. After granular graphite is added, the friction coefficient is obviously increased though it fades slightly in the late stage of braking, and the amount of wear is reduced obviously.

| Braking speed, km/h | Braking pressure, MPa | Friction coefficient of embodiment 1 | Friction coefficient of embodiment 2 |
|---|---|---|---|
| 1100/50 | 0.31 | 0.337 | 0.437 |
|  |  | 0.322 | 0.422 |
|  |  | 0.326 | 0.42 |
| 1700/80 | 0.31 | 0.29 | 0.411 |
|  |  | 0.304 | 0.424 |
|  |  | 0.33 | 0.432 |
| 2600/120 | 0.31 | 0.31 | 0.419 |
|  |  | 0.32 | 0.425 |
|  |  | 0.332 | 0.433 |
| 3400/160 | 0.31 | 0.315 | 0.421 |
|  |  | 0.324 | 0.429 |
|  |  | 0.334 | 0.431 |
| 4200/200 | 0.31 | 0.325 | 0.429 |
|  |  | 0.326 | 0.425 |
|  |  | 0.334 | 0.419 |
| 4700/220 | 0.48 | 0.32 | 0.395 |
|  |  | 0.317 | 0.402 |
|  |  | 0.32 | 0.388 |
| 5300/250 | 0.48 | 0.329 | 0.399 |
|  |  | 0.33 | 0.407 |
|  |  | 0.326 | 0.405 |
| 6300/300 | 0.48 | 0.327 | 0.4 |
|  |  | 0.33 | 0.396 |
|  |  | 0.332 | 0.399 |
| 7400/350 | 0.48 | 0.321 | 0.39 |
|  |  | 0.33 | 0.402 |
|  |  | 0.331 | 0.397 |
| 7400/350 | 0.48 | 0.326 | 0.385 |
| 7400/350 | 0.48 | 0.333 | 0.391 |
| 7400/350 | 0.48 | 0.328 | 0.376 |
| 7400/350 | 0.48 | 0.324 | 0.373 |
| 7400/350 | 0.48 | 0.323 | 0.374 |
| 7400/350 | 0.48 | 0.324 | 0.366 |
| 7400/350 | 0.48 | 0.325 | 0.367 |
| 7400/350 | 0.48 | 0.324 | 0.372 |
| 7400/350 | 0.48 | 0.321 | 0.365 |
| 7400/350 | 0.48 | 0.319 | 0.368 |

Embodiment 3

In the copper-based powder metallurgy brake pad for high-speed railway train in the present disclosure, focus is set to a synergetic effect of ferrochromium and chromium. Therefore, the synergetic effect is emphasized in this embodiment. 58 wt. % copper powder (50 μm), 18 wt. % iron powder (100 μm), 7 wt. % flake graphite powder (400 μm), 5 wt. % granular graphite powder (250 μm), 3 wt. % titanium oxide powder (6.5 μm), 2 wt. % molybdenum disulfide powder (100 μm), 3 wt. % chromium powder (40 μm), and 4 wt. % high carbon ferrochrome powder (40 μm) are poured into a double-cone atomizing mixer, the materials are rolled as the mixing cylinder rotates continuously, a binding lubricant solution is sprayed in an atomized form with high pressure gas at about 0.1 MPa pressure and contacts with the rolling material sufficiently; after 6 h material mixing, the homogeneously mixed powder is molded by cold-press molding at 460 MPa pressure. A cold compact is sintered in a hot pressing sintering furnace by heating up to 880° C., sintering in mixed hydrogen and nitrogen gas, and holding at the temperature for 100 min, at the constant hot pressing pressure of 1.5 MPa; the compact is cooled down to 100° C. at a constant pressure, and then is take out.

Embodiment 4

In the copper-based powder metallurgy brake pad for high-speed railway train in the present disclosure, focus is set to a synergetic effect of ferrochromium and chromium. Therefore, the synergetic effect is emphasized in this embodiment. 58 wt. % copper powder (58 μm), 18 wt. % iron powder (115 μm), 7 wt. % flake graphite powder (250 μm), 5 wt. % granular graphite powder (250 μm), 3 wt. % titanium oxide powder (2.6 μm), 2 wt. % molybdenum disulfide powder (115 μm), and 7 wt. % chromium powder (38 μm) are poured into a double-cone atomizing mixer, the materials are rolled as the mixing cylinder rotates continuously, a binding lubricant solution is sprayed in an atomized form with high pressure gas at about 0.1 MPa pressure and contacts with the rolling material sufficiently; after 6 h material mixing, the homogeneously mixed powder is molded by cold-press molding at 460 MPa pressure. A cold compact is sintered in a hot pressing sintering furnace by heating up to 880° C., sintering in mixed hydrogen and nitrogen gas, and holding at the temperature for 100 min, at 1.5 MPa constant hot pressing pressure; the compact is cooled down to 100° C. at a constant pressure, and then is take out.

Embodiment 5

In the copper-based powder metallurgy brake pad for high-speed railway train in the present disclosure, focus is set to a synergetic effect of ferrochromium and chromium. Therefore, the synergetic effect is emphasized in this embodiment. 58 wt. % copper powder (58 μm), 18 wt. % iron powder (115 μm), 7 wt. % flake graphite powder (250 μm), 5 wt. % granular graphite powder (250 μm), 3 wt. % titanium oxide powder (2.6 μm), 2 wt. % molybdenum disulfide powder (115 μm), and 7 wt. % high carbon ferrochrome powder (38 μm) are poured into a double-cone atomizing mixer, the materials are rolled as the mixing cylinder rotates continuously, a binding lubricant solution is sprayed in an atomized form with high pressure gas at about 0.1 MPa pressure and contacts with the rolling material sufficiently; after 6 h material mixing, the homogeneously mixed powder is molded by cold-press molding at 460 MPa pressure. A cold compact is sintered in a hot pressing sintering furnace by heating up to 880° C., sintering in mixed hydrogen and nitrogen gas, and holding at the temperature for 100 min, at 1.5 MPa constant hot pressing pressure; the compact is cooled down to 100° C. at a constant pressure, and then is take out.

Through comparing the embodiments 3-5, it is seen that the friction coefficient of a brake pad material with 7 wt. % CrFe is low and stable from low speed to high speed, but the amount of wear is large. A brake pad material with 7 wt. % Cr has a high friction coefficient at low speed; the friction coefficient is lower at high speed, and the friction coefficient fades in the last stage of the braking test, but the amount of wear is still large. A brake pad material with 4 wt. % CrFe and 7 wt. % Cr maintains a relatively stable and high friction coefficient in the entire braking process, and has a small amount of wear, which indicates that the synergetic effect of chromium and ferrochromium can remarkably improve the braking performance of the material.

| Braking speed, km/h | Braking pressure, MPa | Friction coefficient of embodiment 3 | Friction coefficient of embodiment 4 | Friction coefficient of embodiment 5 |
| --- | --- | --- | --- | --- |
| 1100/50 | 0.31 | 0.386 | 0.342 | 0.417 |
|  |  | 0.406 | 0.368 | 0.424 |
|  |  | 0.412 | 0.372 | 0.441 |
| 1700/80 | 0.31 | 0.398 | 0.351 | 0.431 |
|  |  | 0.406 | 0.354 | 0.436 |
|  |  | 0.42 | 0.357 | 0.461 |
| 2600/120 | 0.31 | 0.393 | 0.366 | 0.412 |
|  |  | 0.39 | 0.359 | 0.399 |
|  |  | 0.393 | 0.356 | 0.406 |
| 3400/160 | 0.31 | 0.398 | 0.36 | 0.398 |
|  |  | 0.41 | 0.36 | 0.402 |
|  |  | 0.416 | 0.369 | 0.395 |
| 4200/200 | 0.31 | 0.394 | 0.36 | 0.406 |
|  |  | 0.394 | 0.363 | 0.406 |
|  |  | 0.406 | 0.37 | 0.407 |
| 4700/220 | 0.48 | 0.374 | 0.352 | 0.357 |
|  |  | 0.384 | 0.35 | 0.358 |
|  |  | 0.37 | 0.351 | 0.358 |
| 5300/250 | 0.48 | 0.371 | 0.358 | 0.353 |
|  |  | 0.372 | 0.356 | 0.352 |
|  |  | 0.376 | 0.351 | 0.353 |

| Braking speed, km/h | Braking pressure, MPa | Friction coefficient of embodiment 3 | Friction coefficient of embodiment 4 | Friction coefficient of embodiment 5 |
|---|---|---|---|---|
| 6300/300 | 0.48 | 0.379 | 0.351 | 0.365 |
|  |  | 0.377 | 0.351 | 0.364 |
|  |  | 0.376 | 0.352 | 0.381 |
| 7400/350 | 0.48 | 0.387 | 0.348 | 0.387 |
|  |  | 0.395 | 0.343 | 0.394 |
|  |  | 0.389 | 0.346 | 0.392 |
| 7400/350 | 0.48 | 0.379 | 0.355 | 0.392 |
| 7400/350 | 0.48 | 0.374 | 0.351 | 0.394 |
| 7400/350 | 0.48 | 0.369 | 0.338 | 0.396 |
| 7400/350 | 0.48 | 0.366 | 0.334 | 0.389 |
| 7400/350 | 0.48 | 0.372 | 0.334 | 0.378 |
| 7400/350 | 0.48 | 0.37 | 0.327 | 0.376 |
| 7400/350 | 0.48 | 0.369 | 0.33 | 0.371 |
| 7400/350 | 0.48 | 0.368 | 0.335 | 0.363 |
| 7400/350 | 0.48 | 0.37 | 0.329 | 0.362 |
| 7400/350 | 0.48 | 0.373 | 0.33 | 0.353 |

Embodiment 6: Fiber-Reinforced Copper-Based Powder Metallurgy Brake Pad Containing 2 Wt. % Silicon Carbide Fibers 56 wt. % copper powder (45 μm), 18 wt. % iron powder (48 μm), 7 wt. % flake graphite powder (250 μm), 5 wt. % granular graphite powder (160 μm), 3 wt. % titanium oxide powder (6.5 μm), 2 wt. % molybdenum disulfide powder (48 μm), 3 wt. % chromium powder (45 μm), 4 wt. % high carbon ferrochrome powder (45 μm), and 2 wt. % silicon carbide fibers (with diameter of 0.5 μm and length of 30 μm) are poured into a double-cone atomizing mixer, the materials are rolled as the mixing cylinder rotates continuously, a binding lubricant solution is sprayed in an atomized form with high pressure gas at about 0.5 MPa pressure and contacts with the rolling material sufficiently; after 8 h material mixing, the homogeneously mixed powder is molded by cold-press molding at 500 MPa pressure. A cold compact is sintered in a hot-pressed sintering furnace by heating up to 900° C., sintering in mixed hydrogen and nitrogen gas, and holding at the temperature for 120 min, at 2.5 MPa constant hot-pressed pressure; the compact is cooled down to 100° C. at a constant pressure and then taken out.

Embodiment 7: Fiber-Reinforced Copper-Based Powder Metallurgy Brake Pad Containing 1 Wt. % Aluminum Oxide Fibers 57 wt. % copper powder (45 μm), 18 wt. % iron powder (48 μm), 7 wt. % flake graphite powder (250 μm), 5 wt. % granular graphite powder (160 μm), 3 wt. % titanium oxide powder (6.5 μm), 2 wt. % molybdenum disulfide powder (48 μm), 3 wt. % chromium powder (45 μm), 4 wt. % high carbon ferrochrome powder (45 μm), and 1 wt. % aluminum oxide fibers (with diameter of 8 μm and length of 75 μm) are poured into a double-cone atomizing mixer, the materials are rolled as the mixing cylinder rotates continuously, a binding lubricant solution is sprayed in an atomized form with high pressure gas at about 0.1 MPa pressure and contacts with the rolling material sufficiently; after 6 h material mixing, the homogeneously mixed powder is molded by cold-press molding at 460 MPa pressure. A cold compact is sintered in a hot-pressed sintering furnace by heating up to 880° C., sintering in mixed hydrogen and nitrogen gas, and holding at the temperature for 120 min, at 1.5 MPa constant hot pressing pressure; the compact is cooled down to 100° C. at a constant pressure and then taken out.

Embodiment 8: Fiber-Reinforced Copper-Based Powder Metallurgy Brake Pad Containing 2 Wt. % Carbon Fibers 56 wt. % copper powder (45 μm), 18 wt. % iron powder (48 μm), 7 wt. % flake graphite powder (250 μm), 5 wt. % granular graphite powder (160 μm), 3 wt. % titanium oxide powder (6.5 μm), 2 wt. % molybdenum disulfide powder (48 μm), 3 wt. % chromium powder (45 μm), 4 wt. % high carbon ferrochrome powder (45 μm), and 2 wt. % carbide fibers (with diameter of 0.3 μm and length of 30 μm) are poured into a double-cone atomizing mixer, the materials are rolled as the mixing cylinder rotates continuously, a binding lubricant solution is sprayed in an atomized form with high pressure gas at about 0.5 MPa pressure and contacts with the rolling material sufficiently; after 8 h material mixing, the homogeneously mixed powder is molded by cold-press molding at 500 MPa pressure. A cold compact is sintered in a hot pressing sintering furnace by heating up to 900° C., sintering in mixed hydrogen and nitrogen gas, and holding at the temperature for 120 min, at 2.5 MPa constant hot pressing pressure; the compact is cooled down to 100° C. at a constant pressure and then taken out.

Embodiment 9: Fiber-Reinforced Copper-Based Powder Metallurgy Brake Pad Containing 1.5 Wt. % Aluminum Oxide Fibers and 1 wt. % Carbon Fibers 55.5 wt. % copper powder (45 μm), 18 wt. % iron powder (48 μm), 7 wt. % flake graphite powder (250 μm), 5 wt. % granular graphite powder (160 μm), 3 wt. % titanium oxide powder (6.5 μm), 2 wt. % molybdenum disulfide powder (48 μm), 3 wt. % chromium powder (45 μm), 4 wt. % high carbon ferrochrome powder (45 μm), 1.5 wt. % aluminum oxide fibers (with diameter of 8 μm and length of 75 μm), and 1 wt. % carbon fibers (with diameter of 0.3 μm and length of 30 μm) are poured into a double-cone atomizing mixer, the materials are rolled as the mixing cylinder rotates continuously, a binding lubricant solution is sprayed in an atomized form with high pressure gas at about 0.5 MPa pressure and contacts with the rolling material sufficiently; after 8 h material mixing, the homogeneously mixed powder is molded by cold-press molding at 500 MPa pressure. A cold compact is sintered in a hot pressing sintering furnace by heating up to 900° C., sintering in mixed hydrogen and nitrogen gas, and holding at the temperature for 120 min, at 2.5 MPa constant hot pressing pressure; the compact is cooled down to 100° C. at a constant pressure and then taken out.

In the copper-based powder metallurgy brake pad for high-speed railway train in the present disclosure, focus is set to the effects of fibers. Therefore, the effect is emphasized in the embodiments 6-8. The result demonstrates that the friction coefficients of the three materials are high and stable, and essentially are 0.36-0.42, and have no obvious fading at high speed. Among them, the friction coefficient of the material with aluminum oxide fibers is the highest, and the friction coefficient of the material with carbon fibers is the lowest. However, the brake pad material with carbon fibers has the lowest amount of wear. The above embodiments demonstrate the rationality of the composition design and preparation process of the inventive brake pad, and also fully demonstrate the excellent friction wear properties of the material.

| Braking speed, km/h | Braking pressure, MPa | Friction coefficient of embodiment 6 | Friction coefficient of embodiment 7 | Friction coefficient of embodiment 8 | Friction coefficient of embodiment 9 |
|---|---|---|---|---|---|
| 1100/50 | 0.31 | 0.382 | 0.355 | 0.385 | 0.38 |
|  |  | 0.406 | 0.371 | 0.397 | 0.402 |
|  |  | 0.412 | 0.387 | 0.405 | 0.403 |
| 1700/80 | 0.31 | 0.404 | 0.366 | 0.378 | 0.408 |
|  |  | 0.421 | 0.367 | 0.391 | 0.409 |
|  |  | 0.432 | 0.379 | 0.402 | 0.407 |
| 2600/120 | 0.31 | 0.437 | 0.376 | 0.395 | 0.413 |
|  |  | 0.427 | 0.386 | 0.402 | 0.412 |
|  |  | 0.437 | 0.392 | 0.394 | 0.411 |
| 3400/160 | 0.31 | 0.422 | 0.377 | 0.403 | 0.396 |
|  |  | 0.412 | 0.377 | 0.414 | 0.403 |
|  |  | 0.422 | 0.374 | 0.382 | 0.4 |
| 4200/200 | 0.31 | 0.417 | 0.383 | 0.397 | 0.398 |
|  |  | 0.411 | 0.392 | 0.394 | 0.396 |
|  |  | 0.424 | 0.388 | 0.399 | 0.397 |
| 4700/220 | 0.48 | 0.372 | 0.361 | 0.366 | 0.362 |
|  |  | 0.382 | 0.359 | 0.367 | 0.366 |
|  |  | 0.394 | 0.364 | 0.373 | 0.365 |
| 5300/250 | 0.48 | 0.386 | 0.369 | 0.375 | 0.360 |
|  |  | 0.387 | 0.37 | 0.375 | 0.362 |
|  |  | 0.38 | 0.368 | 0.38 | 0.360 |
| 6300/300 | 0.48 | 0.375 | 0.358 | 0.378 | 0.356 |
|  |  | 0.382 | 0.368 | 0.38 | 0.359 |
|  |  | 0.39 | 0.372 | 0.375 | 0.358 |
| 7400/350 | 0.48 | 0.387 | 0.358 | 0.373 | 0.367 |
|  |  | 0.4 | 0.359 | 0.369 | 0.368 |
|  |  | 0.39 | 0.367 | 0.372 | 0.364 |
| 7400/350 | 0.48 | 0.377 | 0.36 | 0.369 | 0.367 |
| 7400/350 | 0.48 | 0.379 | 0.358 | 0.368 | 0.383 |
| 7400/350 | 0.48 | 0.386 | 0.354 | 0.372 | 0.381 |
| 7400/350 | 0.48 | 0.385 | 0.363 | 0.367 | 0.385 |
| 7400/350 | 0.48 | 0.386 | 0.364 | 0.365 | 0.375 |
| 7400/350 | 0.48 | 0.39 | 0.36 | 0.362 | 0.367 |
| 7400/350 | 0.48 | 0.391 | 0.36 | 0.361 | 0.363 |
| 7400/350 | 0.48 | 0.381 | 0.357 | 0.359 | 0.368 |
| 7400/350 | 0.48 | 0.385 | 0.356 | 0.351 | 0.364 |
| 7400/350 | 0.48 | 0.383 | 0.354 | 0.467 | 0.363 |

The compositions of the copper-based brake pads in the test examples 1-8 are shown in Table 1:

TABLE 1

Compositions of Copper-Based Brake Pad Materials (Weight Percentage)

| Embodiment | Copper powder | Iron powder | Flake graphite | Granular graphite | Chromium powder | High carbon ferrochrome powder | Titanium oxide | Molybdenum disulfide | Fibers |
|---|---|---|---|---|---|---|---|---|---|
| 1 | 59 (62 μm) | 18 (106 μm) | 7 (300 μm) | 5 (180 μm) | 4 (45 μm) | 4 (45 μm) | 1 (6.5 μm) | 2 (106 μm) | — |
| 2 | 59 (62 μm) | 18 (106 μm) | 12 (300 μm) | — | 4 (45 μm) | 4 (45 μm) | 1 (6.5 μm) | 2 (106 μm) | — |
| 3 | 58 (58 μm) | 18 (115 μm) | 7 (250 μm) | 5 (250 μm) | 3 (38 μm) | 4 (38 μm) | 3 (2.6 μm) | 2 (115 μm) | — |
| 4 | 58 (58 μm) | 18 (115 μm) | 7 (250 μm) | 5 (250 μm) | 7 (38 μm) | — | 3 (2.6 μm) | 2 (115 μm) | — |
| 5 | 58 (58 μm) | 18 (115 μm) | 7 (250 μm) | 5 (250 μm) | — | 7 (38 μm) | 3 (2.6 μm) | 2 (115 μm) | — |

TABLE 1-continued

Compositions of Copper-Based Brake Pad Materials (Weight Percentage)

| Embodiment | Copper powder | Iron powder | Flake graphite | Granular graphite | Chromium powder | High carbon ferrochrome powder | Titanium oxide | Molybdenum disulfide | Fibers |
|---|---|---|---|---|---|---|---|---|---|
| 6 | 56 (45 μm) | 18 (48 μm) | 7 (250 μm) | 5 (160 μm) | 3 (45 μm) | 4 (45 μm) | 3 (6.5 μm) | 2 (48 μm) | 2 SiC |
| 7 | 57 (45 μm) | 18 (48 μm) | 7 (250 μm) | 5 (160 μm) | 3 (45 μm) | 4 (45 μm) | 3 (6.5 μm) | 2 (48 μm) | 1 Al$_2$O$_3$ |
| 8 | 56 (45 μm) | 18 (48 μm) | 7 (250 μm) | 5 (160 μm) | 3 (45 μm) | 4 (45 μm) | 3 (6.5 μm) | 2 (48 μm) | 2 C |
| 9 | 55.5 (45 μm) | 18 (48 μm) | 7 (250 μm) | 5 (160 μm) | 3 (45 μm) | 4 (45 μm) | 3 (6.5 μm) | 2 (48 μm) | 1.5 Al$_2$O$_3$ + 1% C |

Since the embodiments 2 and 1 are compared, and the embodiments 4, 5 and 3 are compared, here only the physical properties of the embodiments 2, 3, and 6-8 are listed.

TABLE 2

Some Physical Property Parameters of the Brake Pads in the above Embodiments 1-5.

| Scheme | Density (g/cm$^3$) | Brinell hardness (HBW) | Compression strength (MPa) | Shearing strength (MPa) | Damage to the brake disc | Fading of friction coefficient * |
|---|---|---|---|---|---|---|
| Embodiment 2 | 4.929 | 26.5 | 119 | 26.88 | More severe | 0.017 |
| Embodiment 3 | 4.982 | 26.16 | 117 | 26.77 | Severe | 0.006 |
| Embodiment 6 | 4.858 | 27.27 | 126 | 27.59 | Slight | None |
| Embodiment 7 | 4.901 | 28.48 | 138 | 28.71 | Slight | 0.006 |
| Embodiment 8 | 4.853 | 26.75 | 120 | 27.93 | Not obvious | 0.001 |
| Embodiment 9 | 4.867 | 27.55 | 129 | 28.20 | Not obvious | 0.004 |

* The calculated fading of friction coefficient is represented by the difference between the friction coefficient in the first time of emergency braking and the friction coefficient in the last time of braking.

While the present disclosure is described in detail above in embodiments, those embodiments are only preferred embodiments of the present disclosure and shall not be deemed as constituting any limitation to the scope of the present disclosure. Any equivalent modification or improvement, etc. made on the basis of the scope of the present application shall be deemed as encompassed by the scope of patent of the present disclosure.

The foregoing description of the exemplary embodiments of the present disclosure has been presented only for the purposes of illustration and description and is not intended to be exhaustive or to limit the present disclosure to the precise forms disclosed. Many modifications and variations are possible in light of the above teaching.

The embodiments were chosen and described in order to explain the principles of the present disclosure and their practical application so as to activate others skilled in the art to utilize the present disclosure and various embodiments and with various modifications as are suited to the particular use contemplated. Alternative embodiments will become apparent to those skilled in the art to which the present disclosure pertains without departing from its spirit and scope. Accordingly, the scope of the present disclosure is defined by the appended claims rather than the foregoing description and the exemplary embodiments described therein.

What is claimed is:

1. A fiber-reinforced copper-based powder metallurgy brake pad for high-speed railway train, wherein the composition of the copper-based powder metallurgy brake pad comprises metal powder, non-metal powder and a fiber component;

the weight percentage of the metal powder is 80-98.5%;
the weight percentage of the non-metal powder is 1-20%;
and the weight percentage of the fiber component is 0.5-5%;

wherein the weight percentages of the components of the metal powder are as follows: copper powder: 45-65%; iron powder: 15-30%; anatase titanium dioxide powder: 1-10%; molybdenum disulfide powder: 1-5%; chromium powder: 1-10%; high carbon ferrochrome powder: 1-10%; the particle size of the copper powder is 48-75 μm; the particle size of the iron powder is 45-150 μm; the particle size of the titanium oxide powder is less than 10 μm, the particle size of the molybdenum disulfide powder is 45-150 μm; the particle size of the chromium powder is 10-48 μm; and the particle size of the high carbon ferrochrome powder is 10-48 μm.

2. The fiber-reinforced copper-based powder metallurgy brake pad according to claim 1, wherein: the weight percentages of the components of the non-metal powder are as follows: flake graphite powder: 1-10%; granular graphite powder: 1-10%; the particle size of the flake graphite powder is 180-380 μm; and the particle size of the granular graphite powder is 106-300 μm.

3. The fiber-reinforced copper-based powder metallurgy brake pad according to claim 1, wherein: in a case that the fiber component is one of rigid aluminum oxide fibers, silicon carbide fibers or flexible carbon fibers: wherein, the weight percentage of the fiber component is 1-5% if aluminum oxide fibers are selected, and the weight percentage of the fiber component is 0.5-3% if silicon carbide fibers or carbon fibers are selected.

4. The fiber-reinforced copper-based powder metallurgy brake pad according to claim 3, wherein: in a case that the fiber component is a mixture of rigid aluminum oxide fibers or silicon carbide fibers and flexible carbon fibers; the ratio of the rigid aluminum oxide fibers or the silicon carbide fibers to the flexible carbon fibers is 1:0.5~1:1; and the weight percentage of the mixed fibers is 1-4%.

5. The fiber-reinforced copper-based powder metallurgy brake pad according to claim 4, wherein: the constituents of the fiber component are as follows: aluminum oxide fibers with diameter of 5-20 μm and length of 10-100 μm; silicon carbide fibers with diameter of 0.1-0.5 μm and length of 10-50 μm; carbon fibers with diameter of 0.2-0.6 μm and length of 5-50 μm.

6. The fiber-reinforced copper-based powder metallurgy brake pad according to claim 5, wherein: the length-diameter ratio of the rigid aluminum oxide fibers is 5:1~20:1; and the length-diameter ratio of the rigid silicon carbide fibers or flexible carbon fibers is 10:1~100:1.

7. The fiber-reinforced copper-based powder metallurgy brake pad according to claim 2, wherein: the weight ratio of the granular graphite powder to the flake graphite powder is 1:1~1:1.5.

8. The fiber-reinforced copper-based powder metallurgy brake pad according to claim 1, wherein: the weight ratio of the chromium powder to the high carbon ferrochrome powder is 1:1~1:1.5.

9. A method for preparing a fiber-reinforced copper-based powder metallurgy brake pad for high-speed railway train, wherein the composition of the copper-based powder metallurgy brake pad comprises metal powder, non-metal powder and a fiber component;
the weight percentage of the metal powder is 80-98.5%;
the weight percentage of the non-metal powder is 1-20%; and the weight percentage of the fiber component is 0.5-5%;
comprises the following steps:
step I. mixing of powder: loading raw material powder at a preset component mixture ratio into a double-cane atomizing mixer; turning on a heat transfer oil pump; heating up a mixing cylinder to 80-140° C.; dissolving a binder in a solvent at the temperature of 60-100° C. to form a binder solution; heating up the binder solution to 80-120° C.; carrying the binder solution with a gas at 0.1 MPa-1 MPa pressure for loading the binder solution into the double-cane atomizing mixer; adding the binder solution into a continuously rolling material by atomizing and spraying; mixing the material and the binder solution for 6-10 h to obtain binder-treated powder;
step II. pressing of powder: molding the binder-treated powder by cold-press molding at the pressure of 400-500 MPa to obtain a cold-pressed compact; and
step III. sintering of brake pad: sintering the cold-pressed compact in a hot-pressed sintering furnace at the sintering temperature of 850° C.-950° C. and hot pressing pressure of 2 MPa-4 MPa for 60-120 min, in a mixed sintering atmosphere composed of hydrogen and nitrogen; cooling down the compact to a temperature lower than 100° C. at a constant pressure, and then taking out the compact; thus, a sintered copper-based brake pad is obtained.

10. The method according to claim 9, wherein the weight percentage of components of the binder is: ethylene bis-stearamide, 40-70%; paraffin, 10-20%; polyamide wax, 15-30%; lauric acid, 2-5%; stearic acid, 20-40%; isooctanoid acid, 2-5%; and polymethacrylate, 5-10%.

11. The method according to claim 9, wherein the solvent is n-heptane; the binder content in the binder solution is 0.1-0.7 wt. %; and the dissolving temperature of the binder is 60-100° C.

12. The method according to claim 9, wherein: the weight percentages of the components of the metal powder are as follows: copper powder: 45-65%; iron powder: 15-30%; anatase titanium dioxide powder: 1-10%; molybdenum disulfide powder: 1-5%; chromium powder: 1-10%; high carbon ferrochrome powder: 1-10%; the particle size of the copper powder is 48-75 μm; the particle size of the iron powder is 45-150 μm; the particle size of the titanium oxide powder is less than 10 μm, the particle size of the molybdenum disulfide powder is 45-150 μm; the particle size of the chromium powder is 10-48 μm; and the particle size of the high carbon ferrochrome powder is 10-48 μm.

13. The method according to claim 9, wherein: the weight percentages of the components of the non-metal powder are as follows: flake graphite powder: 1-10%; granular graphite powder: 1-10%; the particle size of the flake graphite powder is 180-380 μm; and the particle size of the granular graphite powder is 106-300 μm.

14. The method according to claim 9, wherein: in a case that the fiber component is one of rigid aluminum oxide fibers, silicon carbide fibers or flexible carbon fibers: wherein, the weight percentage of the fiber component is 1-5% if aluminum oxide fibers are selected, and the weight percentage of the fiber component is 0.5-3% if silicon carbide fibers or carbon fibers are selected.

15. The method according to claim 14, wherein: in a case that the fiber component is a mixture of rigid aluminum oxide fibers or silicon carbide fibers and flexible carbon fibers; the ratio of the rigid aluminum oxide fibers or the silicon carbide fibers to the flexible carbon fibers is 1:0.5~1:1; and the weight percentage of the mixed fibers is 1-4%.

16. The method according to claim 15, wherein: the constituents of the fiber component are as follows: aluminum oxide fibers with diameter of 5-20 μm and length of 10-100 μm; silicon carbide fibers with diameter of 0.1-0.5 μm and length of 10-50 μm; carbon fibers with diameter of 0.2-0.6 μm and length of 5-50 μm.

17. The method according to claim 16, wherein: the length-diameter ratio of the rigid aluminum oxide fibers is 5:1~20:1; and the length-diameter ratio of the rigid silicon carbide fibers or flexible carbon fibers is 10:1~100:1.

18. The method according to claim 13, wherein: the weight ratio of the granular graphite powder to the flake graphite powder is 1:1~1:1.5.

19. A method for testing the friction braking performance of the fiber-reinforced copper-based powder metallurgy brake pad according to claim 1, wherein, comprising three stages:
first stage: a stage with low-pressure and low-speed: setting a brake pressure to be lower than 0.35 MPa and getting a testing braking speed at intervals of 20-50 km/h from 0-200 km/h, repeating the test for at least 3 times at each testing braking speed, and setting an initial temperature to be lower than 60° C.;
second stage: a stage with high-pressure and high-speed: increasing the braking pressure to 0.35-0.6 MPa and setting the braking speed to 200-400 km/h, repeating the test for at least 3 times at each testing braking speed, and setting the initial temperature to be not higher than 60° C.; and
third stage: applying emergency braking for 10 times consecutively at maximum braking pressure and maximum braking speed with a braking interval not longer than 1 min, logging an average friction coefficient in each braking time and the total amount of wear after the entire test is completed.

* * * * *